United States Patent
Bianchi

(10) Patent No.: US 7,225,334 B2
(45) Date of Patent: May 29, 2007

(54) SECURE METHOD FOR COMMUNICATING AND PROVIDING SERVICES ON DIGITAL NETWORKS AND IMPLEMENTING ARCHITECTURE

(75) Inventor: Jean-Pierre Bianchi, Liege (BE)

(73) Assignee: Multimedia Engineering Company (BE)

( * ) Notice: Subject to any disclaimer, the term of this patent is extended or adjusted under 35 U.S.C. 154(b) by 611 days.

(21) Appl. No.: 10/415,716

(22) PCT Filed: Mar. 20, 2001

(86) PCT No.: PCT/EP01/03274

§ 371 (c)(1),
(2), (4) Date: Sep. 16, 2003

(87) PCT Pub. No.: WO02/37794

PCT Pub. Date: May 10, 2002

(65) Prior Publication Data

US 2004/0059921 A1    Mar. 25, 2004

(30) Foreign Application Priority Data

Nov. 2, 2000 (GB) ................................. 0026803.7

(51) Int. Cl.
*G06F 1/24* (2006.01)
(52) U.S. Cl. ...................... 713/164; 713/168; 713/171; 713/162
(58) Field of Classification Search ................ 713/164, 713/168, 171, 162
See application file for complete search history.

(56) References Cited

FOREIGN PATENT DOCUMENTS

EP    1094682 A1    4/2001

OTHER PUBLICATIONS

Boullet, "Voice Over IP in Alcatel Omni PCX 4400 and Omni Office", Electrical Communication, Alcatel, vol. 2000, No. 1, pp. 7-11.

*Primary Examiner*—Thomas R. Peeso
(74) *Attorney, Agent, or Firm*—Barnes & Thornburg LLP

(57) ABSTRACT

The present invention is a method to provide maximum security to transactions and communications made on a digital network with a device comprising a card reader. The device is made of a microphone, a speaker, a dialing device, electronics circuitry, digital ports to facilitate communication with digital networks and a card reader.

22 Claims, 10 Drawing Sheets

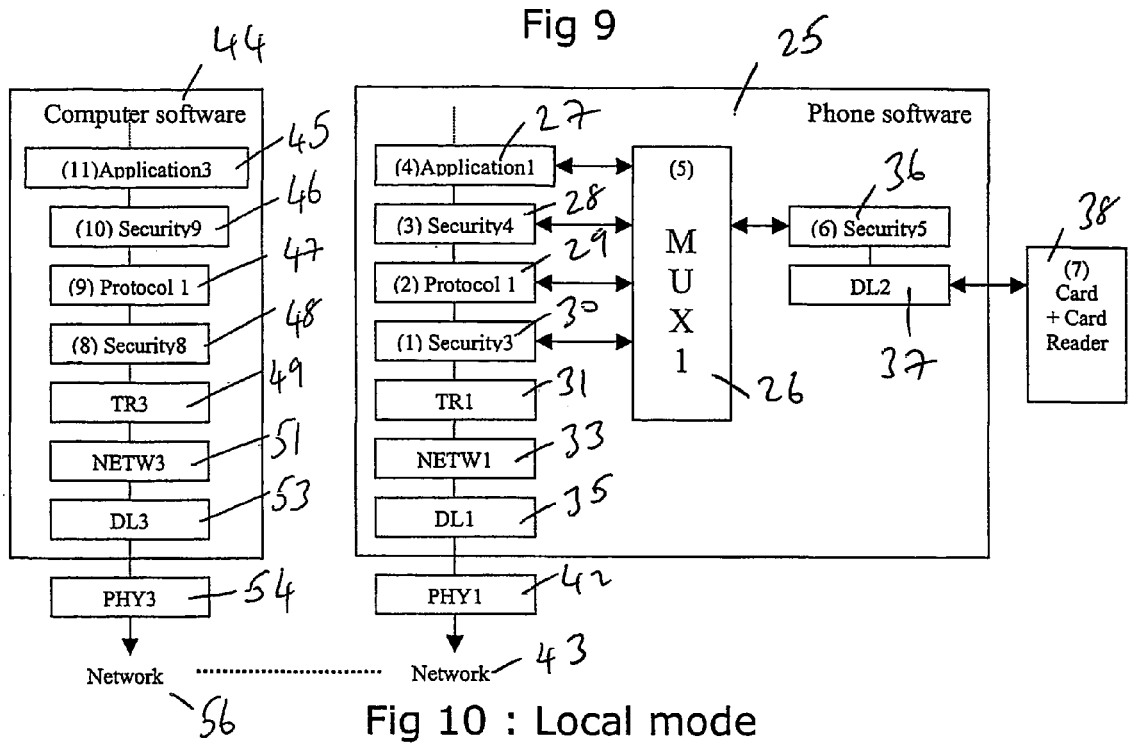
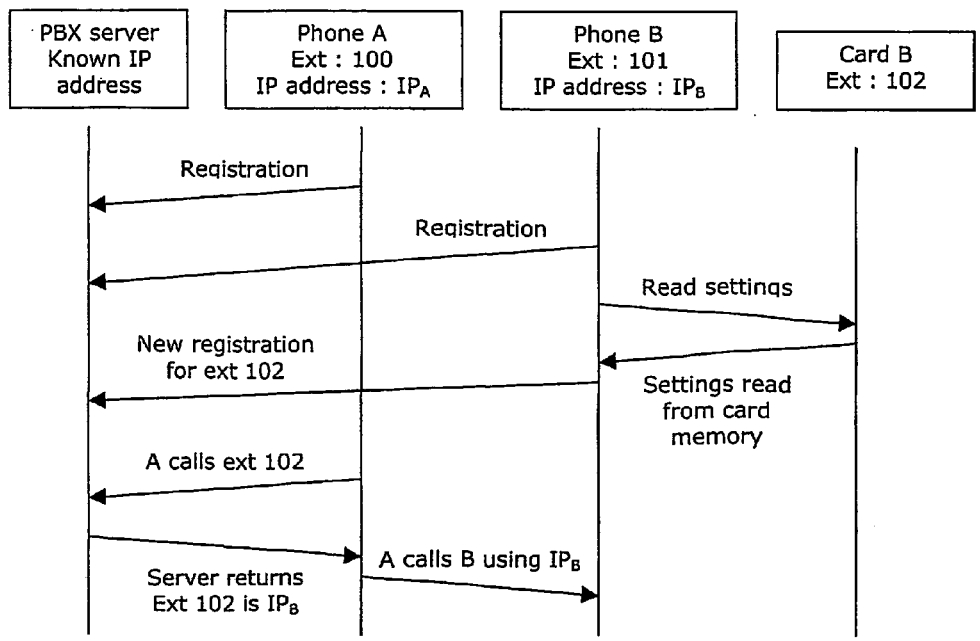
Fig 10 : Local mode

Fig 11 : Tunnel mode
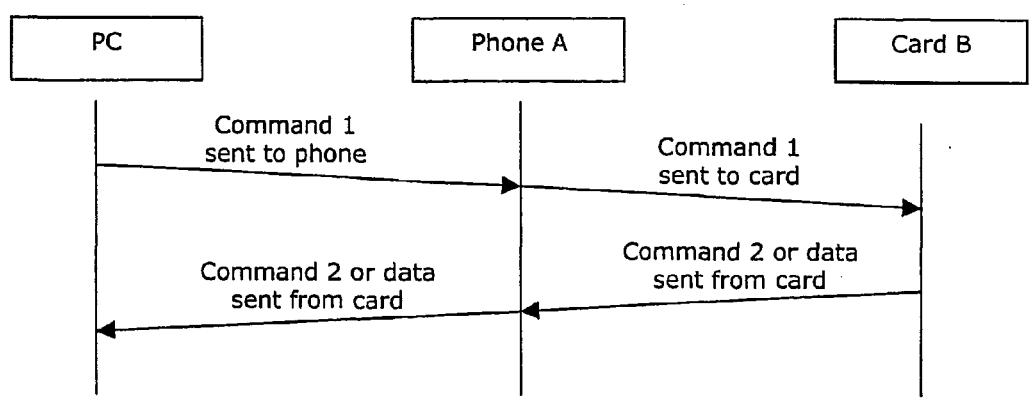
Fig 12 : Slave mode
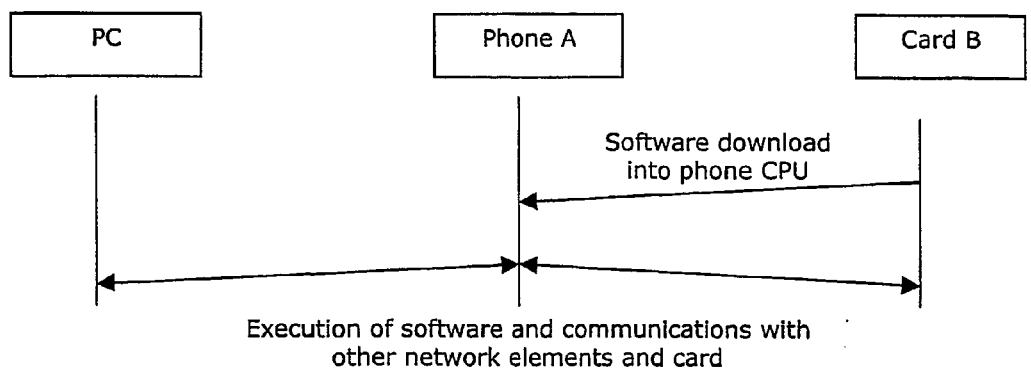

Fig 13 : Security mode
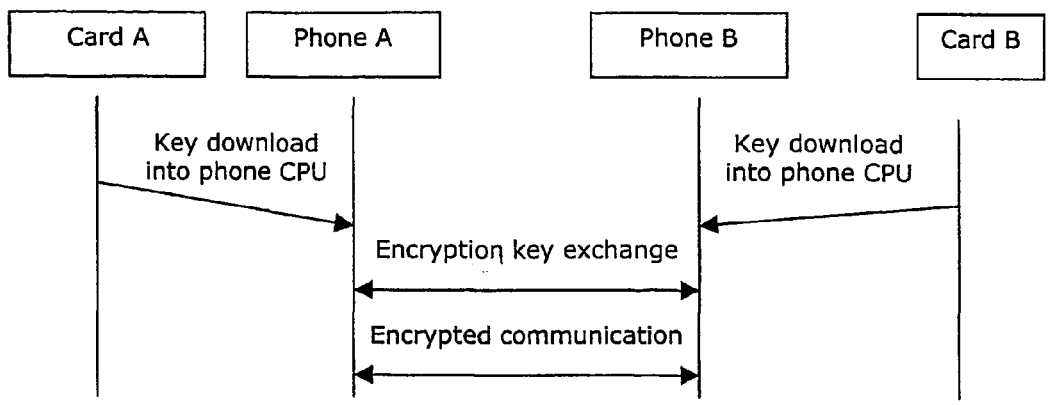
Fig 14 : Enhanced Security mode
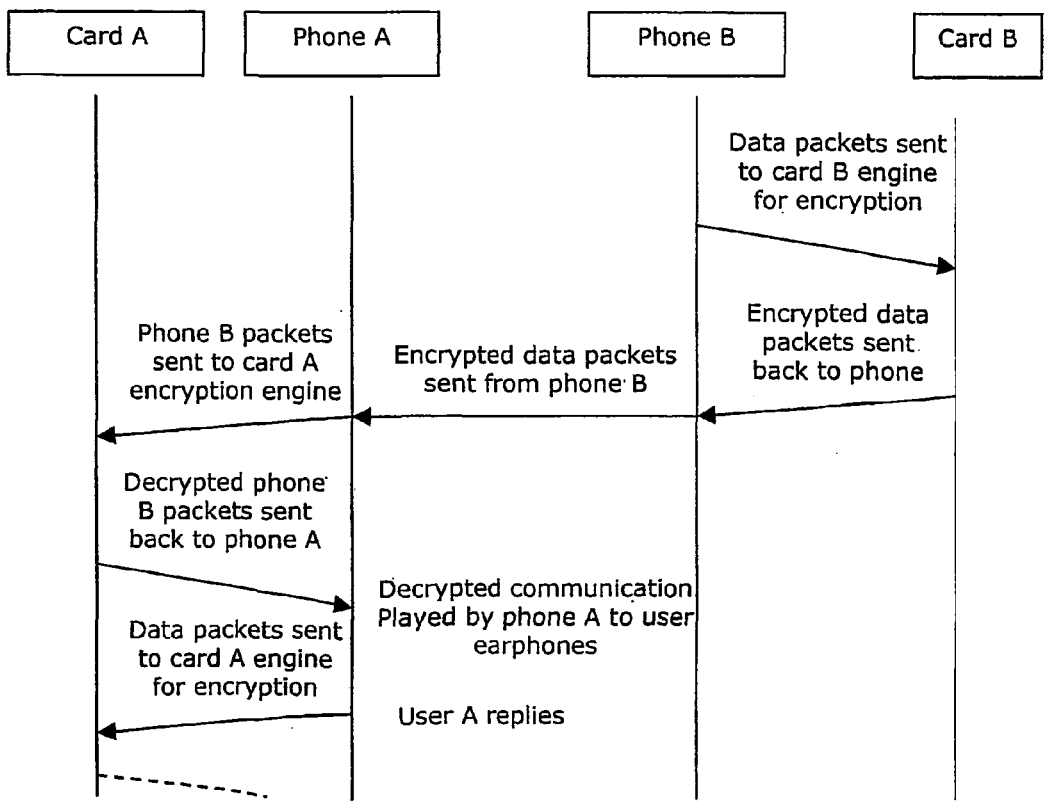

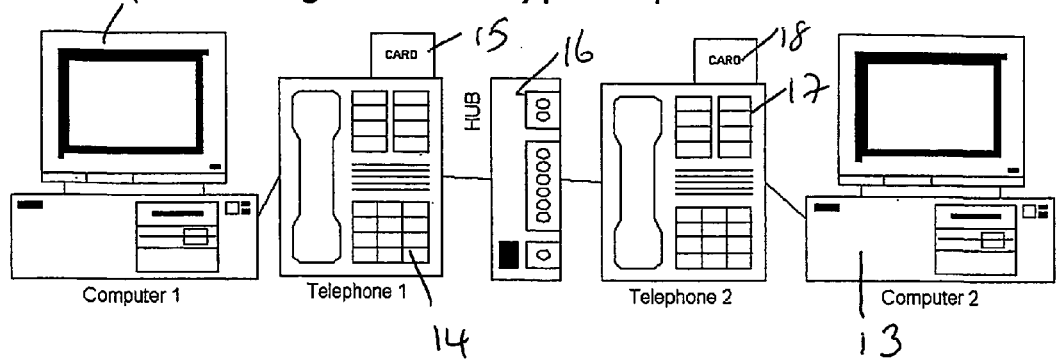
Fig 15 : Encryption platform
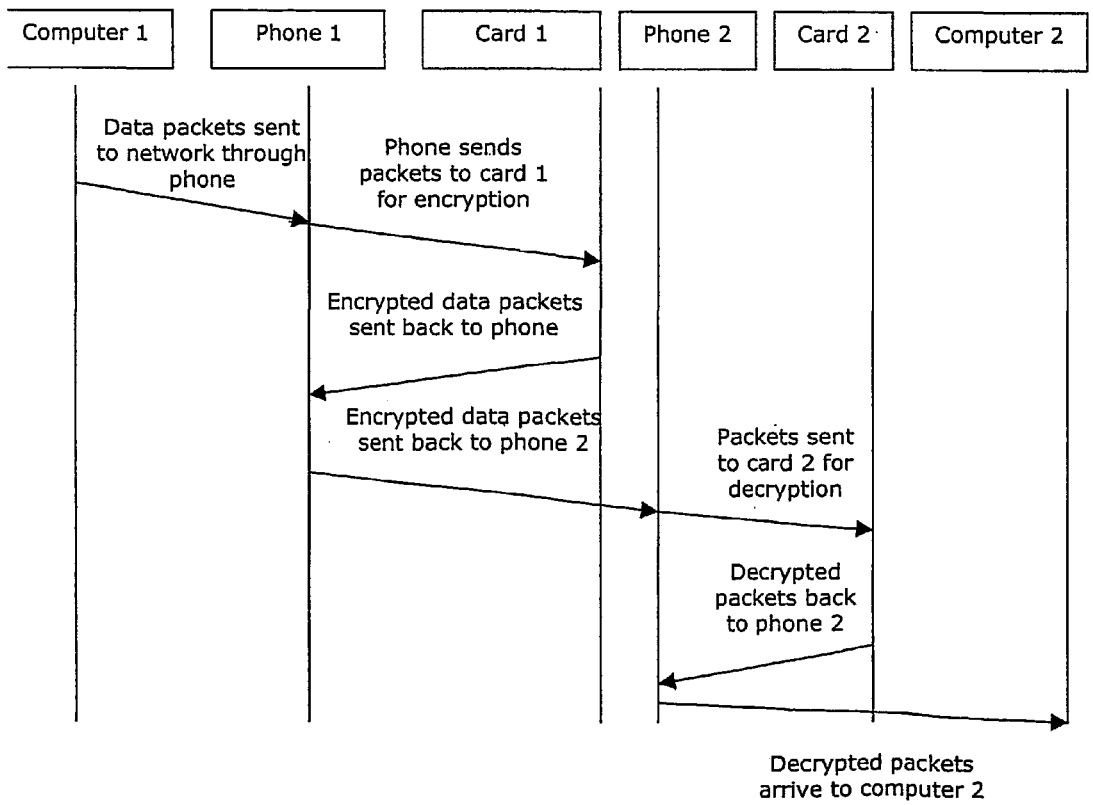
Fig 16 : Encryption platform

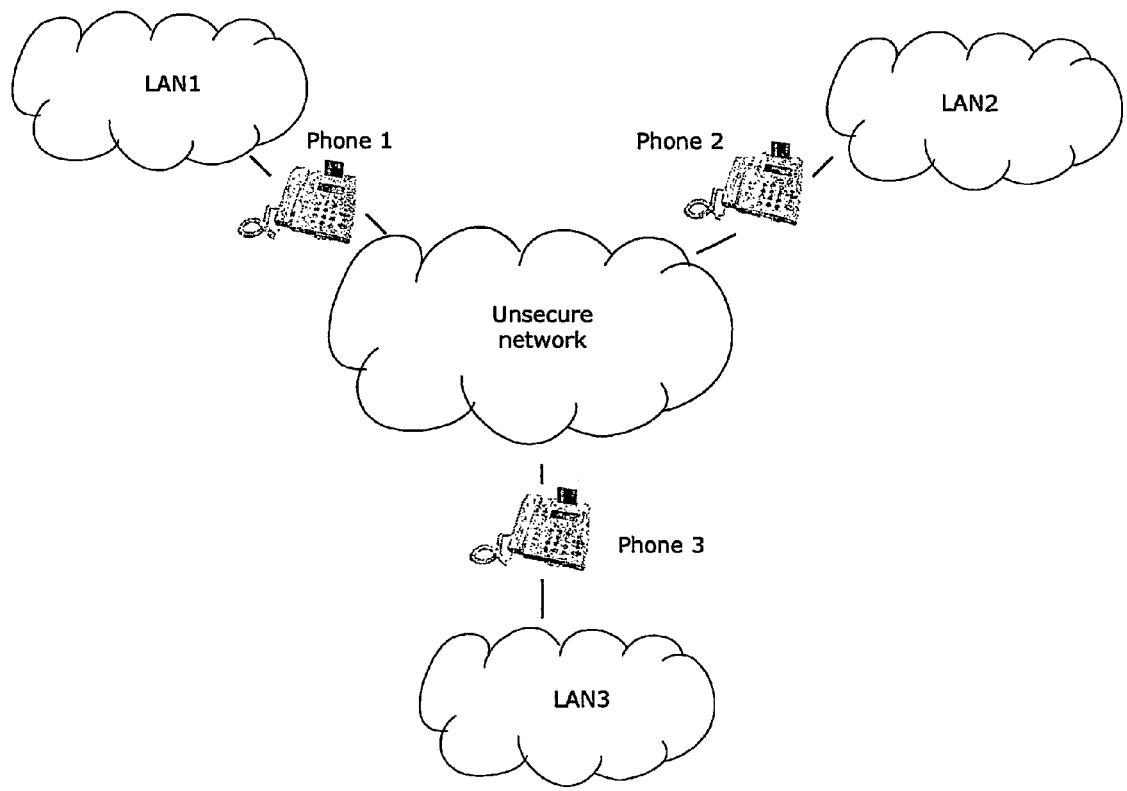
Fig 17 : Dynamic LAN protection

SECURE METHOD FOR COMMUNICATING AND PROVIDING SERVICES ON DIGITAL NETWORKS AND IMPLEMENTING ARCHITECTURE

FIELD OF THE INVENTION

The present invention relates generally to digital networks, such as computer network systems, and security and encryption technology. The present invention relates more particularly to a system for sending and receiving data from a securely authenticated user through the digital network in a secure way such as to prevent any unauthorized user or application from decoding, understanding, modifying or using them. The present invention offers a very high level of security by using electronic cards and encryption mechanisms.

BACKGROUND OF THE INVENTION

Digital networks, such as Ethernet networks or the Internet, are more and more used as channels for multiple type of messages, either pure data, fax or voice, video in order to provide various services.

Typically, computers, faxes, printers communicate through packet switching devices and routers by using the IP protocol for routing data packets. Today, even special phones (knows as 'IP Phones') are capable of digitizing voice and communicate with other such phones or computers, through LANs or WANs.

However, even if data is encrypted by an algorithm running on the platform, that platform is generally accessed with a password. As this password is typed manually on a keyboard, access to the device is granted to anyone knowing the password. This seriously threatens people or companies wanting to restrict the access to their equipment or the information stored on that equipment to authorized people only.

The news constantly report hackers intruding or destroying companies and government databases. One of their method is simply by using the right password, obtained in various ways (guessing, spying, Trojan horses . . . ).

On the other side, there are on the market various types of electronic cards, such as smart cards, containing memory capable of storing personal data and processors (credit cards). These processors are capable of encrypting data using a secret key stored on the card memory before sending the encrypted data out of the card. By using algorithms based on public or secret keys, such as DES, the data can be decoded without having to know the key used for encryption. As the cards are physical devices and they all contain different keys, it is no longer possible to impersonate someone by generating the same string of data as he would. Bank terminals use this system to protect money transactions. Such electronic cards are also very safe because their memory cannot be directly accessed from the outside, some part being even totally inaccessible. Therefore, they are safe from viruses for instance.

Thus, it is very desirable to use this technology to grant access to sensitive devices, information or services. Smart card readers linked to a PC by a serial line are used today in that purpose.

As electronics system invade every aspect of our lives, such as web-enabled refrigerators, there is a need for securing all transactions or communications made with embedded systems, especially the ones connected to easily accessible networks such as a corporate computer network or the internet.

The IP phone, in particular, has all the ingredients to become a secure and universal service-providing and communication platform because it is, by definition, linked to a computer network, and also because it is stand alone, reliable, and, in a near future, cheap, therefore potentially ubiquitous. Its stand alone and reliable nature is a standard requirement in telephony; it must work without a PC, and cannot be based on standard unstable operating systems usually found in offices.

However, as the IP phone usually has no alphanumeric keyboard (for cost and aesthetic reasons), other means must be found to assign it with a private encryption key. And, as it is connected to other devices through a digital network such as Ethernet, any frame sent or received by it can be easily monitored from any machine on the network. As a result, extreme precautions must be taken to practically implement user authentication on the platform and to secure all transactions involving the device.

An electronic card, such as a smart card, can be used to restrict access to the device to authorized people, encrypt, or participate in the encryption of, data flowing in and out of the device, and also store all personal data of the user (public key, certificates, passwords, phone numbers, URLs, health information, fiscal information . . . ). It can be used as a universal and unique mean for using all electronic devices and services.

Patent WO 00/33522 describes the architecture of a network telephony system which is basically an IP phone. It is mainly focused on describing such architecture which even contains an encryption module. However, it is not suitable to implement an open architecture security in network transactions and communications, and does not use a card reader.

Patent FR 2783383 describes a phone with a smart card reader. However, it is described as a 'public' phone, and the reader is for reading prepaid cards. Its architecture renders it unable to connect directly to a high speed network such as Ethernet, and it does not offer secure communications, secure key distribution and it is not an open and secure communication platform that corporations can build applications upon.

Patent EP 0989529A1 (FR 9811745) describes a system using a smart card in order to read sets of parameter enabling the device to access applications on a remote server, without the user having to memorize access codes, URLs . . . It is not related to security or digital telephony, but rather on ease of use.

Patent WO 00/10139 describes a sophisticated smart card capable of running on board applications. It uses a standard general purpose terminal to interface to the network, but the card requires specific software. It does mention the possibility of encryption by the card engine, but that requires that all sensitive data flow through the card engine, even before they reach terminal layer 3 protocols (such as IP).

Patent WO 00/04476 describes a system capable of connecting to the Internet for doing e-commerce, e-business and voice communications. The system can be a phone and use any type of card for authenticating the user, but this is where security ends. It does not relate to securing transactions and communications.

SUMMARY OF THE INVENTION

The present invention is embodied in a very secure system and method to communicate and/or provide services through a digital network.

The present invention may provide a network device for use in a network and supporting Voice over IP, the device comprising: a housing; one or more ports providing access to a network and configured to facilitate communication with other devices on the network; a security unit contained within the housing of the network device, a processor contained within the housing for operating the network device and in communication with the security unit, wherein the security unit is adapted to provide at least one of: storing and using user personal data from a data carrier insertable in the security unit, providing at least one encryption key, using an encryption key, using an encryption engine, without the security unit affecting the support of voice communication. Further embodiments of the present invention are defined in the attached claims.

One aspect of the present invention provides a secure platform for communicating and providing services through digital networks. Communications can be of any type, such as data, text but also audio and video. Services can be any private or business application such as electronic mail, electronic commerce and electronic business. Security can be implemented through the use of at least one reader of a portable memory or processor carrier such as a card. The carrier can be of any suitable type, smart card, laser card, magnetic card such as a credit card, prepaid card, hotel room key card, rod-shaped microprocessor carrier, privately-issued electronic cards, or any insertable card. Other devices could be used to enhance security or ease of use, such as biometric identification (voice, finger, eye, retina analysys/scanning). Integrated circuits with encryption engines and even secret keys embedded directly in their silicon transistors at the foundry can also be used with the present invention. Also, in some applications where the card must be embedded in a network device, the card reduces to only the portion of the card containing the electronic circuits and the physical interfaces (e.g. gold contacts). From now on, the term 'smart card' will be used to designate any type of such cards or circuits. Such terminology is by way of example only and not by way of limitation.

Another aspect of the invention is to provide a method for securing data sent from a network device, and decoding data received by it, using proprietary or standard encryption algorithms, running on a processor in the network device and/or on a card itself, and using data and secret or public keys stored in the device memory or the card memory, or even data from remote units or applications. Data received can be totally or partially encrypted, and be interpreted by the network device either as data to be stored on one of the cards, or to be used by an application running on the platform, or even instructions to be executed either by a card or the platform. Data sent by the network device can come from one card, the application running on the device, or both, and it can be totally or partially encrypted.

Another aspect of the invention provides a method for using the device as an encryption/decryption engine of data coming from or going to other devices on the network. For instance, a PC connected to a second network port of the device could have all its data flow encrypted/decrypted by the present invention.

As the network device according to one aspect of the present invention contains a processor, it can also be used as a platform providing specialized or general services, in a totally secure environment through the use of the card technology. Although the term 'Smart IP phone' is used, the present invention is not restricted to this device. For instance, another embodiment of the present invention is a simplified device without voice communications capabilities. In such case, all voice related circuitry or features can be removed (microphone, voice compression algorithms, call forward button, etc.).

Another aspect of the invention provides a method for using more than one card and card reader in a single device. One card and card reader can be directly soldered on the printed circuit board of the device or on a connector in order to provide additional keys and data, possibly totally inaccessible from the outside of the device if desired. As those keys and data can be securely configured during manufacturing, this increases the level of security. An intrusion detection system, detecting the opening of the housing and consequently disabling the device, guarantees the security of the device and the integrity of the system.

It is understood that both the foregoing general description and the following detailed description are exemplary, but are not restrictive of the invention.

ADVANTAGES OF THE INVENTION

The present invention tightly integrates a memory or processor carrier medium and its reader into an IP phone in order to reduce production cost. It also enhances security as the connection between the reader and the phone is made by copper tracks within the electronic board, rather than by an external, therefore easily accessible, cable.

The built-in reader, e.g. card reader, provides a means to securely distribute encryption keys on networked devices without having to send them through the network by using the media introduced into the reader.

As such a platform is stand alone and reliable, it can be used in any place, even those without a computer nearby (elevator, manufacturing, home, corridor, etc.), which renders it a very good candidate for a ubiquitous, universal service-providing and communication device.

As the present invention is connected to a digital network, at least a LAN, but even WANs or the Internet or any other international network, these services can virtually be linked to any aspect of individuals lives which is accessible to such networks.

Also, as the network device of the present invention usually shares the same network including computers, it can interact with any machine or application on the network at full network speed, and can use standard network protocols, thereby offering the possibility to develop easily very powerful and specialized applications or services, such as corporate access policy enforcing, monitoring, corporate databases sharing. This is a very important advantage over current portable phones not connected to a corporate LAN such as mobile telephones, e.g. to the European GSM standard or similar. Even if GSM-LAN gateways are used, all IP protocols cannot be used up to the communication unit (SNMP, ARP, etc.). Mobile telephone transmissions are not as reliable as cabled devices. A network device according to the present invention plugs directly into a computer network without the need for a gateway.

As a network according to the present invention contains a processor, it is possible to provide users with a way of running their own software on the platform, and use all its resources, e.g. memory, network connection, resident software, to develop additional useful applications.

As the Internet invades offices and homes, the present invention can become a consumer product, thereby extending the range of services that can be developed on the platform.

As the present invention communicates through a digital network, it can access other devices, computers, databases, service providers, etc. but it can also be accessed remotely itself. For instance it can provide proper authorization to remote devices, or remote applications can store data on the carrier medium, or display messages on a screen.

As a memory or processor carrier medium such as a card can be personalized (unique identifier), as it is portable, as it can contain personal data (health, fiscal information, etc.) in its memory as well as any code, password, secret key, phone lists, etc., in general any data, private or not, it can be used by an individual for all needs, either services or communications, either private or business, in any place (home, office, hotel, etc. The universality and ubiquity of the present invention provides any individual the possibility to easily and securely access all those services without having to memorize complex data or codes, from anywhere, at anytime.

This will in turn foster the growth of digital services, as service companies, corporations or public institutions exploit the full potential of the present invention to develop new services. For instance, by granting access to the information on the card to doctors, these could instantaneously check the health profile of an elderly complaining of chest pain and take instantaneous action.

The present invention enables the carrier medium in its reader to be accessed, configured and controlled remotely from a well identified remote device in a very secure way in order to receive not only data but also commands through the network. A particularly preferred carrier medium is a card.

BRIEF DESCRIPTION OF THE DRAWINGS

FIG. 9 shows a simplified software architecture of a computer linked with an embodiment of the present invention through a network.

FIG. 10 shows a message flow for an embodiment of the present invention in local mode.

FIG. 11 shows a message flow for an embodiment of the present invention in tunnel mode.

FIG. 12 shows a message flow for an embodiment of the present invention in slave mode.

FIG. 13 shows a message flow for an embodiment of the present invention in security mode.

FIG. 14 shows a message flow for an embodiment of the present invention in enhanced security mode.

FIG. 15 shows a network architecture where two computers communicate through two phones and a hub.

FIG. 16 shows how two computers communicate in enhanced security mode.

FIG. 17 shows how enhanced security mode can protect networks dynamically.

DETAILED DESCRIPTION OF THE INVENTION

The detailed description set forth below in connection with the appended drawings is intended as a description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention. Reference will be made to a "card" but the present invention is not limited thereto. Any suitable pluggable or insertable memory device or especially an insertable or pluggable processing engine such as a microprocessor, a digital programmable device such as a programmable gate array, a PAL, a PLA, an FPGA or similar may be used with the present invention.

Figure 1:
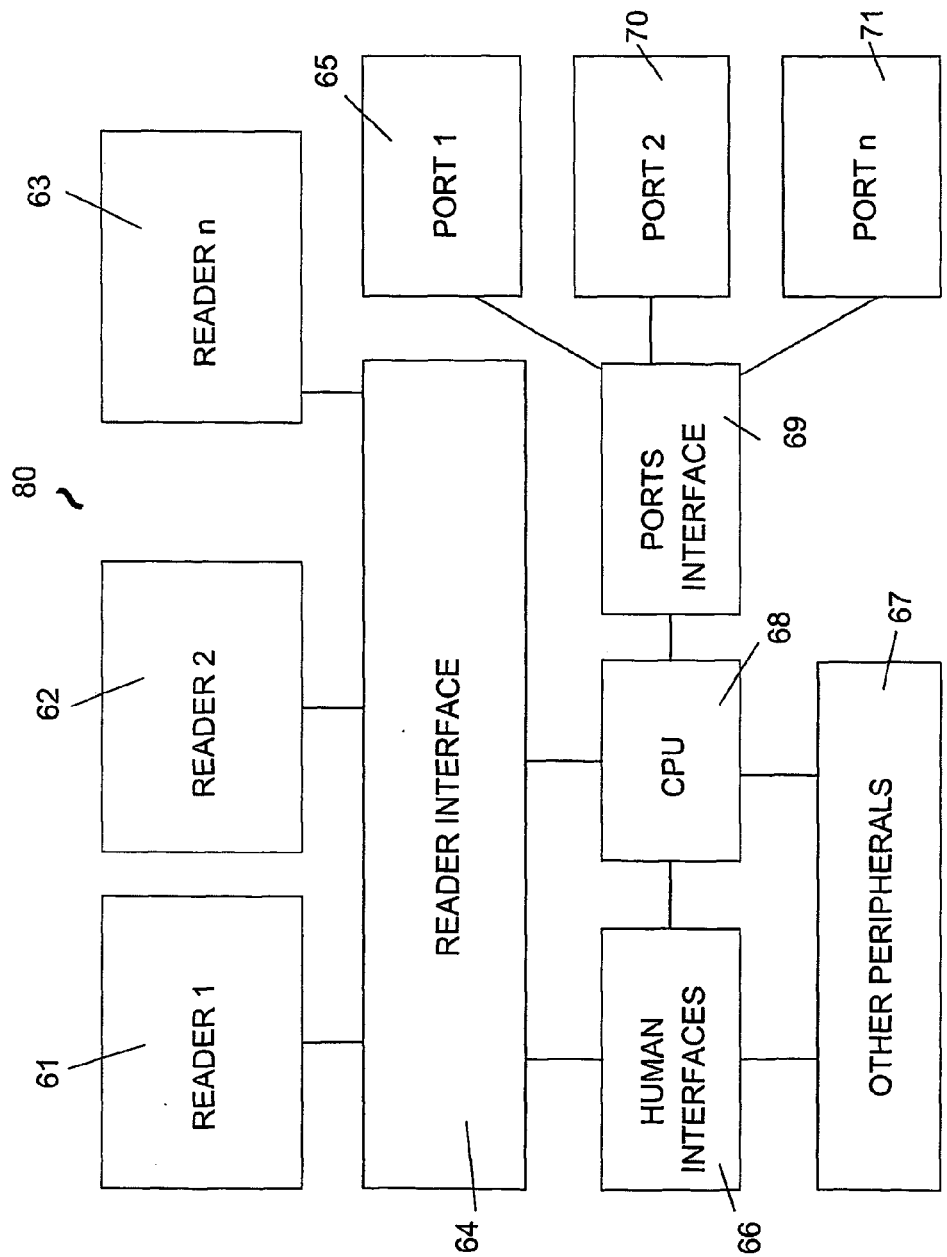
FIG. 1 shows a block diagram of an embodiment the present invention

The present invention includes, as shown on FIG. 1, a network device 80 such as a telephone having a set of human interfaces 66 such as one or more microphones coupled to convert voice or audio signals into electric signals, one or more speakers coupled to convert electric signals into voice or audio signals, one or more dialing devices coupled to enable users to input digital or analog electric signals, one or more displays, diodes, screens of any type to convert electric signals into visual characters or graphics or simple light signals. Other interfaces such as a camera, biometric sensors, a mouse interface, alarms can also be included. Device 80 also includes one or more readers 61, 62 . . . 63 for reading a data carrier such as a memory card or a processor card (see below) and connected to a central processing unit 68 via a bus system and optionally with human interfaces 66.

The present invention may include other peripherals 67 to perform all functions or interfacing jobs required, such as PCMCIA interface, real-time clock, watchdog, relays, data packet switching, parallel or serial interface, dongle port.

Figure 2:
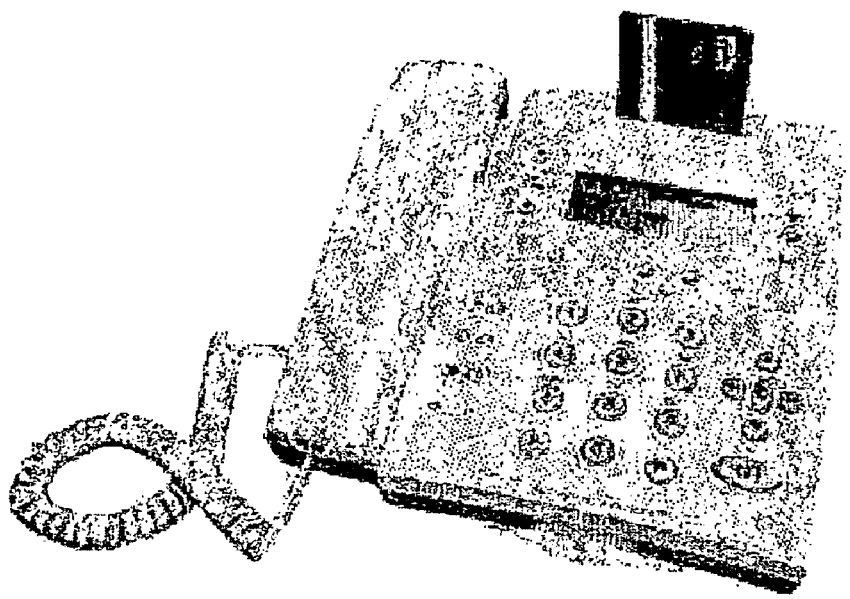
FIG. 2 shows a physical implementation of the present invention

FIG. 2 shows an embodiment of the present invention. It is made of an IP phone 80, with a slot on the cover allowing the insertion of a card 22. From now on, the term 'Smart IP phone' will be used to designate the present invention in order to distinguish it from regular IP phones. This terminology is for convenience only, and it does not restrict by no means the scope of the present invention.

Figure 3:
FIG. 3 shows an example of an electronic card with a laser strip.

FIG. 3 shows a smart card that could be used with the Smart IP phone. Its electrical contacts lie in the square in the upper left corner. It also shows a strip of WORM (Write Once Read Many) memory for storing data which is preferably uneraseable. The strip is to be read with a laser beam. Such card can be used as new citizen ID cards or passports.

The Smart IP phone also includes one or more processors 68, specialized for signal processing (such as so-called Digital Signal Processor, or 'DSP') or not, destined to run all the software necessary to operate the device. They can run signal processing algorithms (voice compression, echo cancellation, video compression or similar), network protocols, such as TCP/IP and applications. The insertable data carrier such as a card will typically include en embedded microprocessor and one or more memory elements or banks under the control of the microprocessor. Other pluggable or removable microprocessor carriers are included within the scope of the present invention such as contactless smart cards (which may include an embedded antenna for communication via radio frequencies instead of via contacts) or tubular microprocessor carriers, e.g. rod-shaped.

To be able to communicate with applications on remote devices (PCs, servers, route, etc.), the present invention can use standard network protocols, such as the IP protocol, because they are ubiquitous in today's corporate Local Area Networks, Wide Area Networks and on the Internet.

Also, one or more interfaces 69 are provided in order to adapt signals inside the device to various ports 65, 70, 71, connecting the device with data networks having sufficient bandwidth to exchange data at a speed required by the application. Networks such as Bluetooth, Ethernet, Token-ring, ATM and xDSL are a non-limiting list of protocols which may be used with the present invention. However, Ethernet networks are ubiquitous and cheap, and therefore widely used in corporate LAN's.

Figure 4:
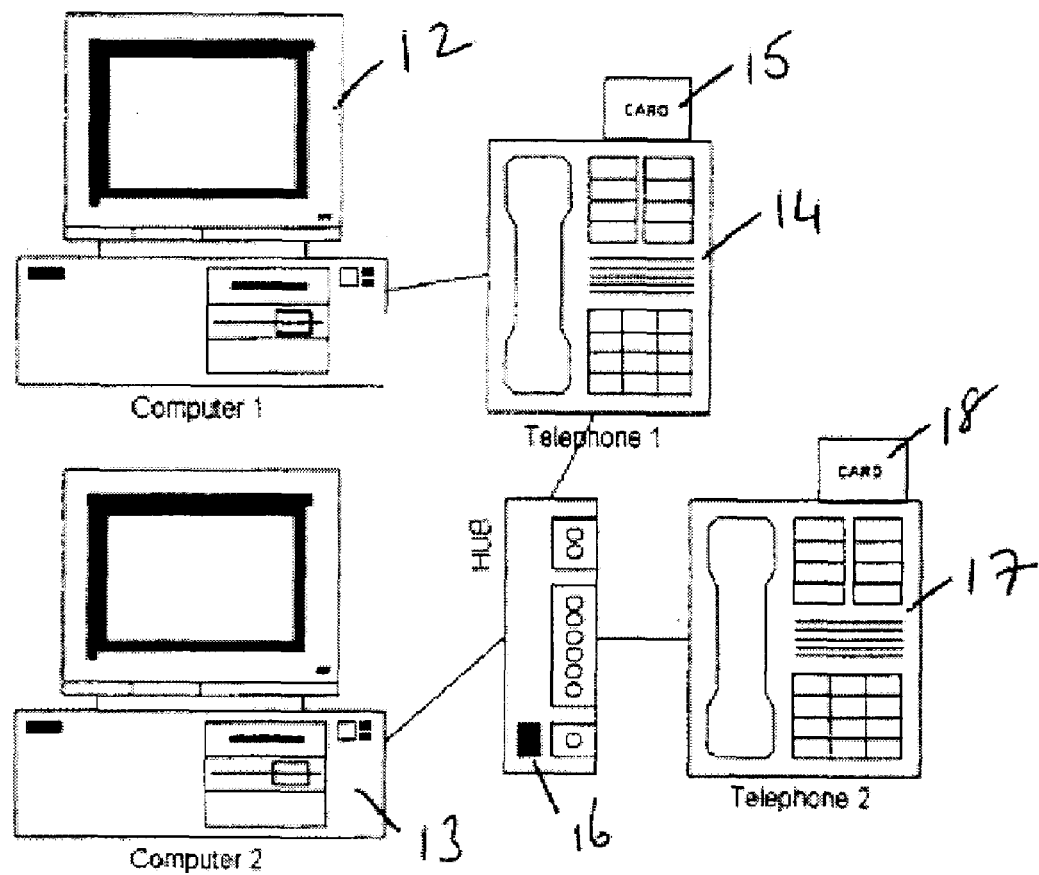
FIG. 4 shows an embodiment of the present invention in a network.

FIG. 4 shows two Smart LP phones 14, 17 within a standard Ethernet network as an embodiment of the present invention. For instance phones 14, 17 may be connected with other network components such as personal computers 12 and 13 through a hub 16. In this example, the Smart LP phone has two Ethernet ports in order to be inserted between a PC 12, 13 and an active or passive port hub 16. One port of the phone connects to the Ethernet port of the computer, the second port connects to the hub. This architecture enables any device to communicate with any other device, either computer of phone.

Although the present invention is described below and illustrated in the drawings as being configured for use in an Ethernet network, those skilled in the art will appreciate that the present invention is likewise suitable for use in various other network environments. Thus, description and illustration of the network telephone in an Ethernet network is by way of example only and not by way of limitation.

Those skilled in the art will appreciate that there are many ways to combine and interconnect all the parts previously mentioned. For example, a serial codec requires a connection to a processor serial input or through a serial interface, a compression algorithm needs a DSP to be executed at the proper speed. Depending on the user's wishes, different microphones, speakers, keyboards, functions, interfaces, ports or other hardware can be required, but, although being potentially complex, such tasks can be handled in known ways by skilled persons. Any such combinations are also included within the scope of the present invention if their functions are described herein.

One important aspect of the invention is the interconnecting of one or more memory or microprocessor carrier readers, e.g. card readers 61, 62 . . . 63, to the previously described hardware, either directly or through one or more interfaces. It is believed that the present invention is not restricted by the way hardware interconnections of all the circuits are done, however, they are preferably well integrated within the housing of the device to prevent eavesdropping or modifying the connections. The way data flows through and is processed by all the components of the system is a particular aspect of the present invention.

Figure 5:
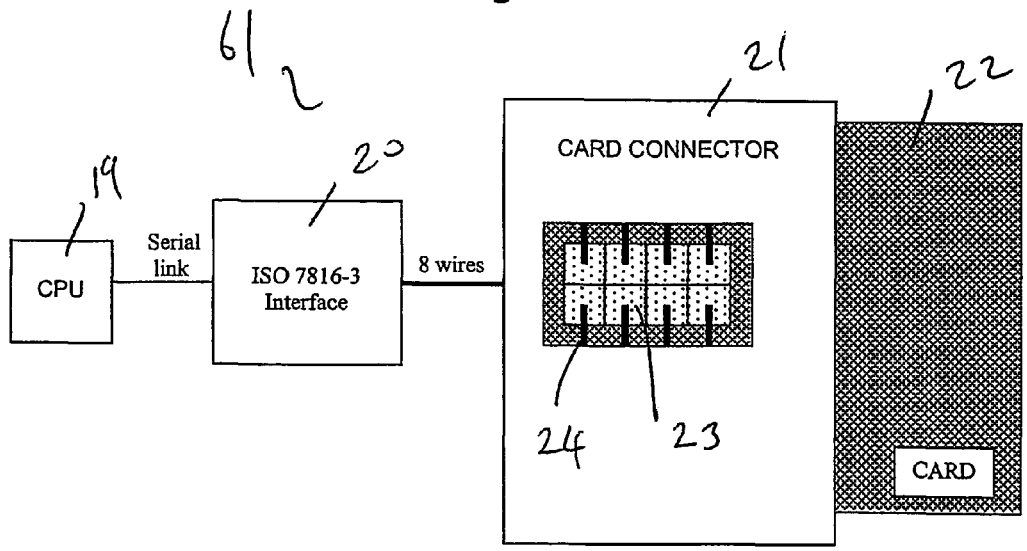
FIG. 5 shows an example of a card interface, with a card inserted.

As shown in FIG. 5, a card reader 61 generally consists of a physical interface, usually a simple connector 21, destined to hold the card 22 and interconnect with the card circuits through, for instance, very simple finger contacts 24 destined to touch a set of gold pads 23 on the card 22. FIG. 5 shows these fingers through a small window in the connector housing, touching the rectangular pads of a smart card.

Other types of cards may require other types of connectors. Magnetic cards require a magnetic head, laser cards require a laser beam, in order to be able to establish a link with the card. The connector provides an interface circuit with electrical signals carrying data using a card-specific protocol. The connector size can be reduced when only the useful portion of a card is used, to save space when a card is entirely embedded within a device for instance. The useful portion is defined as the part of the card containing the memory, the processor (if present) and the physical interfaces (gold contacts, magnetic strip), i.e. all that cannot be removed from a card without affecting its functions or use.

An interface circuit 20 converts signals and protocols coming from the card connector 21 into other signals and protocol understandable by a processor 19, such as over a serial link. The present invention includes within its scope that cards and processors are directly compatible with each other, thereby removing the need of an interface.

Although the present invention is described below and illustrated in the drawings as being configured for use with a smart card compliant with ISO 7816-3 standard, those skilled in the art will appreciate that the network telephone of the present invention is likewise suitable for use with various other types of cards, such as contactless cards, laser cards, magnetic cards, hotel room key cards, prepaid cards or any other insertion card or insertable microprocessor carrier. Thus, description and illustration of the Smart IP phone with a smart card reader is by way of example only and not by way of limitation.

Figure 6:
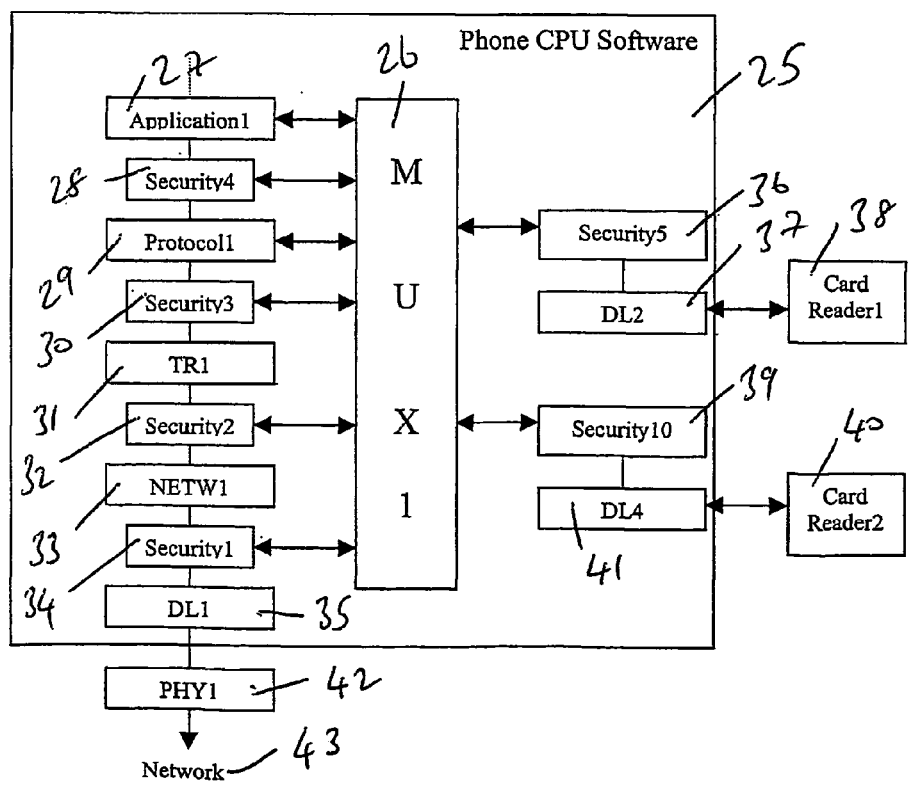
FIG. 6 shows a software architecture of an embodiment of the present invention.

FIG. 6 shows the various layers in the software of a Smart IP phone embodiment. It shows usual layers as defined by the OSI model (Open systems Interconnection reference model) (Physical (PHY, 42), Data link (DL, 35), network (NETW 33), transport (TR 31) etc. up to the application layer 27). Usually, the following applies:

Layer 1 is a physical layer (42) that provides transmission of signals and the activation and deactivation of physical connections;

Layer 2 is a data link layer (35) that includes signal synchronisation, errors correction, sequencing, and flow control. This layer also provides a data transmission link across one or several physical connections;

Layer 3 is a network layer (33) that provides routing and switching function.

Layer 4 is a transport layer (31) utilising layers 1 to 3 to provide end-to-end service having required characteristics for the higher layer functions.

Layer 5 is a session layer that provides the means to establish a session connection and to support an orderly exchange of data and related control functions for a particular communication service.

Layer 6 is a presentation layer that provides means for data formatting and code conversion.

Layer 7 is an application layer (27), the protocols of which can provide an actual service required by an end-user.

In accordance with an embodiment of the present invention, the optional provision of all layers of the OSI model in the central processing unit of the network device of the present invention allows a wide variety of applications to be initiated, carried out and terminated with a variety of active devices.

Today, most Ethernet networks use the IP protocol for the network layer, TCP and UDP for transport. Other layers such as Session and Presentation are not represented as they are not always present. For completeness, they could be imagined as included in layer Protocol 1 (29), which is general purpose software layer that can be used to fit any type of application (call signaling in telephony applications for instance), or provide hardware abstraction to the application layer. Those skilled in the art will appreciate that the present invention is likewise suitable for use with various other types of network standards and network protocols, even proprietary ones. Thus, description and illustration of the Smart IP phone software as complying with OSI is by way of example only and not by way of limitation.

FIG. 6 also shows a series of software 'inter-layers' (labeled Security layers, 28, 30, 32, 34) designed to process, partially of totally, data packets flowing from one or to the layers they are connected to. The complete system makes up the phone software 25.

Those skilled in the art will appreciate that the present invention is likewise suitable for use with various other types of software architectures. Thus, current description and illustration of the Smart IP phone software is by way of example only and not by way of limitation.

From now on, the term 'port' of a layer will be used to designate any endpoint of the data flowing between a layer and any other layer with which it exchanges data. Although FIG. 6 shows only one data flow per layer pair, there could be as many links, and therefore as many ports, as necessary, to implement not only data transmissions, but other functions such as statistics, monitoring, flow control, dynamic adaptation to network parameters or conditions (available bandwidth, transmission delays, packet loss, characteristics of remote devices . . . ), commands, etc. These data flows can be treated separately or together by the various blocks, but they will be described as one for convenience.

'Processing' means any combination of the following operations on the data flowing through the ports, either partially or totally: no operation at all, deviation, storing, encrypting, decrypting, or any other type of algorithm or mathematical operation using, or not, data coming from or going to any ports and/or data previously stored. 'No operation at all' means that the inter-layer let data flow from one of its port to another without any processing. 'Deviation' means that data coming from a port is sent, partially or totally, to any other port. 'Storing' means that that the inter-layer keeps a part of or all data flow for future processing, either in Random Access Memory, or any other type of memory (ROM, Flash, etc.).

'Encrypting' is a general term for describing any mathematical operation or algorithm applied to data. Generally, it uses secret keys in order to render the result of the encryption unreadable to any person not having the decryption key. For instance, DES, triple-DES, RSA are well-known encryption algorithms. 'Decrypting' is a term for describing any mathematical operation or algorithm applied to encrypted data in order to restore the initial data before encryption. Those skilled in the art will appreciate that the present invention is likewise suitable for use with various other types of encryption algorithms. Thus, current description and illustration of the Smart IP phone software is by way of example only and not by way of limitation.

FIG. 6 shows that the software architecture of present invention can be designed in many different ways, depending on the number and the location of security layers, the way they are interconnected and the number of ports they have. FIG. 6 shows a multiplexing software 'MUX1' 26. Its purpose is to interconnect all security or other software layers as necessary. The MUX1 layer can also process data as any other security module.

FIG. 6 also shows that the MUX1 layer can be interconnected to other communication layers (such as DL2, 37; DL4, 39) in order to enable communication with other entities, especially card readers 38, 40. These entities can be either another software package, other hardware, or any combination of hardware and software. Although only layer DL2 or DL4 is shown on FIG. 6, there could be as many layers as required, as previously described.

All the processing done in FIG. 6 can be done either by software, hardware, or any combination of both. Those skilled in the art will appreciate that the present invention is likewise suitable for use with various combinations of hardware and software. Thus, current description and illustration of the architecture of the present invention is by way of example only and not by way of limitation.

One important aspect of the present invention is the connection of the MUX layer to one or more pluggable memories or insertable microprocessors mounted on a carrier, e.g. a card using appropriate hardware interfaces (integrated circuits, card readers, etc.). Such connections increase the functionality and the security of the device because the data flow in the IP phone can be mixed with data or keys stored on the cards or be processed with such data or directly by the processing engines on the cards, if available. When data are introduced in the system from a card, the security is much higher than when it is sent through the network, where it is rather easy to monitor or modify passing data packets. The security is also much higher when the encryption is done by a processing engine (card engine) on the card with a key stored on the card because the key does not even have to leave the card. FIG. 6 shows that the software, at any layer, can access or interact with one or more pluggable memories or microprocessors mounted on a carrier, e.g. a card, via readers 38 or 40.

Figure 7:
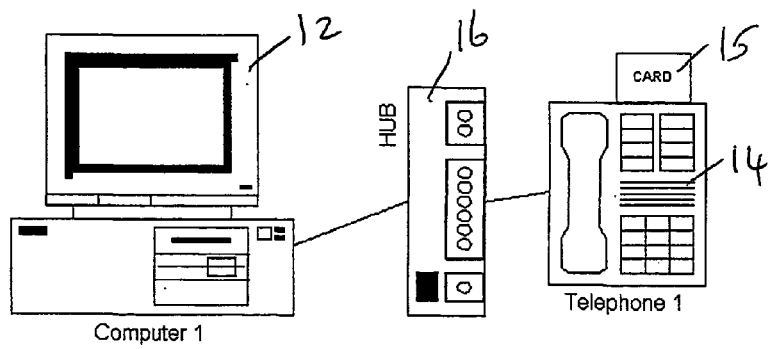
FIG. 7 shows an embodiment of the present invention connected to a computer through a network hub.
Figure 8:
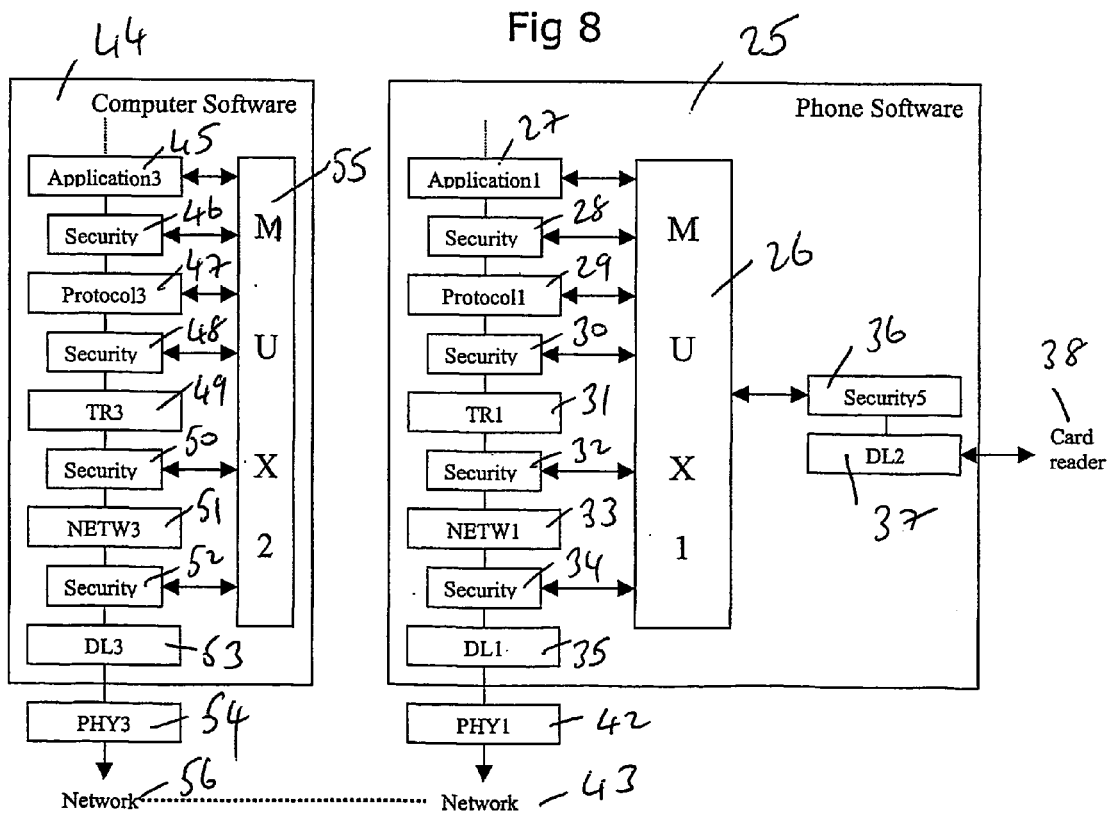
FIG. 8 shows a software architecture of an embodiment of the present invention and a computer, connected through a network.

FIG. 7 shows a computer 12 linked with an IP phone 14 through a computer network in accordance with a further embodiment of the present invention. The computer 12 can have similar software layers 45 to 53 as previously described, as shown in FIG. 8. There is no reader for a pluggable memory or microprocessor mounted on a carrier, e.g. card reader, linked to the computer, but those skilled in the art will appreciate that the present invention is likewise suitable for use with various combinations of PCs and readers for a pluggable memory or microprocessor mounted on a carrier, e.g. card readers. Thus, current description and illustration of the architecture of the present invention is by way of example only and not by way of limitation.

All such combinations offer many implementation schemes with various levels of security, depending on the usage of pluggable memories or microprocessors mounted on a carrier, e.g. cards, or not, their processing engines or not, or on the usage of various encoding algorithms. A few typical schemes will be illustrated to show the possibilities of our invention. In order to simplify the description, simplified architectures of a PC and an Smart IP phone will be described, as shown in FIG. 9.

FIG. 9 illustrates the insertion of security layers 28 between transport layer 31 and an upper protocol layer 29. This latter layer could be for instance a signaling layer such as SIP (Signaling Internet Protocol as defined in IETF RFC 2543bis). Another security layer 28 is found between the protocol layer 29 and the application layer 27. A MUX layer 26, can exchange data with any of the security, protocol or application layers. One last security layer 36 is present between the MUX 26 and the data link layer 37 responsible for providing data to and from a pluggable memory or microprocessor mounted on a carrier, e.g. to or from a card inserted in a reader 38.

The data flow between blocks will be described by a sequence of numbers in brackets (1) to (11) in FIG. 9 identifying all significant blocks. As Phy, DL, Netw and Tr layers cannot be bypassed, they are not numbered in this way however they carry reference numbers not in brackets. The combination 8-1 or 1-8 represents data flowing between the security8 layer (48) in the computer and security3 layer (30) in the phone, through all their transport, network, data link and network layers. Data flowing to or from the pluggable memory or microprocessor mounted on a carrier, e.g. a card (7) can either be data read from the card, stored to the card, processed by the card engine or commands for the card engine, in any possible way. If a block number in brackets is not included, it means that it does not modify data flowing through it, or that it is not even present. For instance, 8-1-4-5-7 describes data flowing from security 8 module in the computer to the phone blocks: security3, application 1, mux1, and then to the pluggable memory or microprocessor mounted on a carrier, e.g. to a card, 2, 3 and 6 having no effect, or are not even there.

The Smart IP phone can be operated in various modes, described as follows, all of which represent separate embodiments of the present invention:

Local Mode (Phone Access)

The card is accessed by the phone software. The phone CPU sends data or commands to the card to execute operations related to the functions of the phone. For instance, this mode is useful for granting access to designated users (by using the authentication capability of smart cards), to the phone itself or other remote devices (protected computer logon or room or device access). This mode can also be used simply to identify the user and use this information for various functions, such as punch clocking, access monitoring, etc.

If a phone number is assigned to the user and stored on the card, the user can be reached by any person having this phone number, even if the caller does not know where the callee physically is. Network parameters such as an IP address could also be stored on a card in order to facilitate or modify the configuration. More generally, if all user-related or terminal-related data or settings are stored on the card, the card containing such profile can be used on any Smart IP phone in the world.

For instance, FIG. 10 shows a message low for an IP telephony system in accordance with an embodiment of the present invention, comprising a PBX server and two IP phones. Each phone has its phone extension and IP address. The PBX server has a known IP address; its role is to help IP phones to communicate with each other by providing them the proper information (availability of caller, authorization, IP address of the callee, etc.).

When a phone is first connected to the network, it automatically registers (or on request by the PBX or by manual intervention of the user of this phone) to the PBX server by providing it with various parameters, and the PBX may or not assign the phone a phone extension depending the company policy. Alternatively, the phone can impose a preferred extension number.

If a user inserts his/her card into phone B, the phone can read various parameters from the card memory (preferred settings such as volume, the user phone extension etc.). In order to operate with the new card-stored user extension, phone B must register again to the server. In this example, phone B, previously having extension 101, informs the PBX that it wants to use phone extension 102. As a result, the user can now be reached from anywhere by anyone not previously knowing where he/she is physically or the phone he/she is using.

For instance, if a user X of phone A wants to call 'user 102', phone A optionally under the control of the user X sends a request to the PBX server, which returns the IP address of the phone where 'user 102' has signaled its position by the insertion of the card. As a result, phone A can now directly call the phone at IP address $IP_B$ to reach 'user 102', with the caller still not knowing where the callee is. Hence, true user mobility is possible, as any user can easily use any phone on the network, even if it is located in another office or country, and be reachable effortlessly by any other user.

This mode is described in FIG. 9 by 4-6-7 for storing encrypted data (by block 6) to the card, or 7-6-4 for reading and decrypting data from the card. More complex treatments are possible, such as 1-5-4-5-6-7 for multiplexing data coming from the network with data from the application, before encrypting and sending it to the card.

Tunnel Mode (Computer Access)

The card may be accessed by remote computer software running on a computer, the phone being only a passive platform simply routing data from the computer to the card, and reciprocally. The phone is still capable at the same time to operate normally, e.g. for conventional communications. This mode is useful for taking control of the card from a remote computer while maintaining normal device functions. The remote computer can simply read or write data on the card, or use its authentication mechanism to grant access to some applications (running on the computer), FIG. 11 shows a message flow for a PC communicating directly with a card B plugged into phone A in accordance with an embodiment of the present invention. All commands and data flowing to and from the PC or the card simply flow through the phone without modification.

More complex uses are possible. For instance, layers 9 and 2 (FIG. 9) may be designed in a way to provide computer applications 11 a standardized interface, such as PCSC or TAPI, in order to enable commercial off-the-shelf applications compliant with such standards to access the card reader as if it were directly connected to the computer by a serial line.

For instance, 11-9-2-6-7, with 9 providing a PCSC interface, allows any PCSC compliant Windows application to use the card reader remotely. Adding security layers (11-9-8-1-2-7) to increase security by encrypting data and command flows could be required as data is easily monitored or modified as they travel across the network. This may be very important if the Smart IP phone is used for payment applications using credit cards.

Slave Mode (Card Access)

In this mode, the card could take control, partially or totally, of the phone platform. The phone CPU could be forced to execute a program stored within the card memory, or receive instructions from the card processor. Therefore, the card can use the phone low level network layers and network hardware to interact with other network devices or applications.

For instance, cards with specific applications may be distributed and executed following user needs without any installation problems, and on any Smart IP phone. For instance, emergency cards with user specific health information, hospital phone numbers and a specific application could automatically call the closest hospital in case of emergency and provide the doctors with all the information they need instantaneously.

Typically, 7-(4)-2-9-11 (FIG. 9) describes such a mode of operation Layers 8-1 can be added to increase security in a LAN environment.

FIG. 12 shows a message flow for a further embodiment of the present invention. Software is downloaded from the card to the phone CPU, and then, the software is executed by the phone CPU, using all communication and execution means of the phone, to exchange data or communicate with other devices on the network or the card.

Security Mode (Card Key Usage)

In this mode, all or partial data exchanged by a Smart IP phone and a computer or another Smart IP phone, as shown in FIG. 10, are encrypted using a secret key stored in the card. The encryption is done by the phone processor. The key can be downloaded from the card using local mode, either, only once (in that case, it must be stored in a non-volatile memory), or every time encryption is needed, which releases the constraint of having to store it in a non-volatile memory, and thereby increases security.

By using smart cards, it is possible to distribute secret encryption keys without sending them across the network, therefore with better security, simply by plugging a card into the Smart IP phones. This method offers the advantage of not having to store a key in the network devices during manufacturing, thereby easing the manufacturing process, and increasing the level of security as the keys are introduced in the system only by corporate IT managers, and only after shipping.

Some high security applications rely on two smart cards, one being plugged normally, the other one being embedded within the device housing in order to provide the system with a private key before shipping, by the manufacturer, or the distributor. If the Smart LP phone is to be used as a Point of Sale, i.e. for payment, it must be able to accept any user credit card in its slot, and thereby needs a second embedded card to implement security needed in such transactions. Specialized chips with secret keys embedded in their silicon transistors at the foundry could also be used.

If the present invention is used as a Point of Sale, it is important to note that it can still be used at the same time to communicate by voice, thereby making the platform very flexible and universal.

An embodiment of the present invention includes an intrusion detection mechanism in order to disable the network device as soon as the housing has been opened, in order to prevent anyone from modifying or reading the keys or the cards. In this mode, voice communications between two Smart IP phones can be encrypted in order to prevent any unauthorized user to listen to communications on the network.

The mode is described in FIG. 9 by 11-10-9-2-3-4, with 3 using a key from 7-6-5-3. 10 and 3 encrypt and decrypt application data, but 8 and 1 could also be use to extend protection to lower protocols.

FIG. 13 shows a message flow of a further embodiment of the present invention. In this embodiment keys from one or more cards are downloaded into each phone in communication with each other, before this communication is encrypted. Keys can be exchanged between the units on a network by using well-known algorithms such as Diffie-Hellman. A secure key server could be also be used.

Enhanced Security Mode (Card Encryption Engine Usage)

In this mode, all or partial data exchanged by a Smart IP phone and a computer or another Smart IP phone, as shown on FIG. 10, are encrypted by the encryption engine of the card. The phone processor can do some encryption as well. Again, if the encryption is not used for the communication, the phone remains available for placing calls simultaneously.

Depending on its speed and power, the card (external or embedded) processing engine can encrypt all or only a part of the data sent to or received from the network. This mode provides a very high level of security as the encryption key does not even leave the card, and is therefore very well protected against eavesdropping.

Maximum level of security is reached when all the encryption keys used are not previously released at all to anyone. This can be achieved by programming pairs of cards with matching keys. This way, data encoded by one card can only be decoded by the other card.

The mode is described by 11-10-9-2-5-7-5-4 in FIG. 9 for received data, and 4-5-7-5-2-9-10-11 for sent data. Additional security could be provided by 8 and 1.

FIG. 14 shows a message flow for a further embodiment of the present invention in enhanced security mode. When phone B has digitized user B's voice message or other type of message, it sends it to card B engine for encryption in this card. As a result, an encryption key does not leave the card at any moment. Encrypted data is sent back to the phone which sends it to phone A. Phone A sends these encrypted data to card A engine. After decryption by card A engine, data are sent back to phone A, that now converts it to an understandable audio signal into phone A earphones or to any other type of signal required. When user A replies, the same process occurs, first implying card A for encryption.

Encryption Platform Mode

In this mode which is a further embodiment of the present invention, a phone 15, 17 has two network ports, one connected to a computer 12, 13, the other to the rest of the network, e.g. via a hub 16 as shown on FIG. 15. The phone is used to encrypt/decrypt all traffic from or to the computer it is directly linked, i.e. computer 1 for telephone 1, and computer 2 for telephone 2.

The encryption is done as in any previously described mode at any security layer. Especially, the enhanced security mode and cards with matching keys can be used to provide maximum security. The encryption can be applied to the data contained within every packet, leaving the header untouched, or to the whole data packet itself. In this last case, the phone must encapsulate the encrypted packet into a new packet and add the appropriate header for the packet to be routed properly by the network.

This mode enables to have two computer exchanging data in a very safe mode, those data being totally unreadable or unusable by any other computer on the network. This is very useful especially when the network has no security mechanisms such as IPsec.

Although the same result could be done without the present invention, by using serial card readers tied to the computer serial ports, this system is totally safe from virus, because encryption/decryption is done by the phone and not the PC, or from internet hackers, because their data will be completely destroyed by the decryption applied by the phone to all data coming from the network. Furthermore, with a serial card reader, it is impossible to encrypt and encapsulate the whole packet because it can be done only when the packet has left the computer.

A message flow for this embodiment is shown in FIG. 16. A computer 1 wants to send data to computer 2 via a network, e.g. a LAN or WAN. Data from computer 1 are sent to the phone 1 (because the PC 1 is physically linked to the phone 1), by the phone 1 to the card 1 for encryption and by the card 1 back to phone 1 which sends it through the network to phone 2. Phone 2 decrypts the data by sending it to its card 2 from which it receives the decrypted data. PC 2 then sends the decrypted data to computer 2. As a result, data from computer 1 have circulated on the network in an encrypted way such that no one is able to read them besides computer 2.

If computers are replaced by LAN1 and LAN2, the present method and apparatus according to the present invention provides a way for securely protecting communications between two LANs. This is especially useful for remote LANs when the security mechanisms provided in between are not well-known or not present. FIG. 17 shows three LANs 57-59 connected to an insecure network 60 through Smart IP Phones 1-3. If proper encryption cards are plugged in phone X and Y, LANs X and Y will be able to communicate in a secure way because of the encryption/ decryption operations done by the phones (X and Y are one of the values 1 to 3). It is therefore possible to dynamically protect areas of networks in a very secure way by the insertion of cards in the appropriate Smart IP Phones. PIN codes can be used to authenticate the network manager.

A very important aspect of the present invention is that the card engines or the keys stored on the cards are used to implement secure communications on a network. The previous modes illustrate how such secure communications can be implemented, but they can be combined in any way to implement a large panel of applications with a high level of security. Phones and computers can communicate with each other, exchange data, remotely configure or being configured, access cards or cards engines, distribute keys or tokens across a network with a high level of security, provided that, at some stage, they use either data or keys from the cards, or cards engine to execute some operations.

It is understood that the exemplary Smart IP phone system described herein and shown in the drawings represents only a preferred embodiment of the invention. Indeed, various modifications and additions may be made to such embodiment without departing from the spirit and scope of the invention.

The invention claimed is:

1. An IP telephone for connection to a LAN or WAN and supporting Voice over IP comprising:
   a housing;
   one or more ports providing access to a network and configured to facilitate communication with other devices on the network;
   a security unit contained within the housing of the IP telephone;
   a processor contained within the housing for operating the IP telephone and in communication with the security unit;
   a data carrier insertable in a card reader, the card reader being in communication with the security unit for storing user personal data, wherein the data carrier is adapted to provide at least one of:
   at least one encryption key,
   use of an encryption key,
   use of an encryption engine.

2. The IP phone of claim 1, wherein the card reader is located within the housing.

3. The IP phone of claim 1, wherein the card reader is connected to IP phone.

4. The IP phone as recited claim 1, wherein the ports comprise Ethernet ports.

5. The IP phone of claim 1, wherein the insertable data carrier is a card or circuit compliant with standard ISO 7816.

6. The IP phone of claim 1, wherein the insertable data carrier is a contactless card.

7. The IP phone according claim 6, wherein the insertable data carrier is a card or circuit compliant with standard ISO 10536.

8. The IP phone of claim 1, wherein the insertable data carrier is an optically readable card.

9. The IP phone of claim 8, wherein the insertable data carrier is a card or a circuit compliant with standard ISO 11694.

10. The IP phone of claim 1, wherein the insertable data carrier is a card and the security unit comprises a card reader made of:
    one or more connectors designed to physically hold and interface with one or more cards;
    one or more card interfaces configured to provide signal and protocol conversion if the card is not directly compatible with the processor.

11. The IP phone of claim 1, wherein the insertable data carrier is a card reduced to their useful portion and the security unit comprises:
    one or more card interfaces configured to provide signal and protocol conversion if the cards reduced to their useful portion are not directly compatible with the processor.

12. The IP phone as recited of claim 1, wherein the security unit comprises:
    one or more integrated circuits;
    one or more circuits interfaces configured to provide signal and protocol conversion if the circuit is not directly compatible with the processor.

13. Method of data transmission using an IP phone according to claim 1, comprising:
    the insertion of security and multiplexing protocol interlayers (security $_i$, mux $_j$);
    secure processing of the data flowing through these interlayers.

14. Method of claim 13, wherein the secure processing is done by the device processor using a key from the insertable data carrier using the security unit.

15. Method of claim 13, wherein the secure processing is done, totally or partially, by a processing engine on the data carrier read by the security unit.

16. Method of data transmission using two IP phones as recited in claim 13, comprising:
    connecting computers directly to a first port of the devices with a different IP phone for each computer;
    connecting a network to a second port of both IP phones;
    transmission, by each IP phone, of data received by its first port to its second port after encryption using secure processing.

17. Method according to claim 16, further comprising the step of:
    transmission, by each IP phone, of data received by the second port to the first port after decryption following secure processing.

18. Method for distributing secret keys to IP phones as recited in claim 1 on a network, the method comprising distributing the secret keys stored in a plurality of insertable memory data carriers, without having to transmit the secret codes through the network.

19. Method to execute software stored on an insertable data carrier or transmit data stored on the insertable data carrier, comprising: using resources of an IP phone as recited in claim 1, to execute the software or to transmit the data.

20. Method of configuring an IP phone as recited in claim 1, comprising configuring the IP phone by accessing data stored on the insertable data carrier.

21. Method of granting access to authorized users to an IP phone as recited in claim 1, the method comprising accessing the insertable data carrier.

22. Method of end-to-end secure encrypting of data flowing between two networks using two IP phones claim 1, comprising:
- connecting the two networks directly to a first port of the IP phones with a different device for each network;
- connecting a network to a second port of both IP phones;
- transmission, by each IP phone, of data received by its first port to its second port after encryption; and
- transmission, by each IP phone, of data received by the second port to the first port after decryption.

* * * * *